April 2, 1929. A. J. HAND 1,707,433
AUTOMATIC ELECTRIC WELDING APPARATUS
Filed Feb. 15, 1927 3 Sheets-Sheet 2
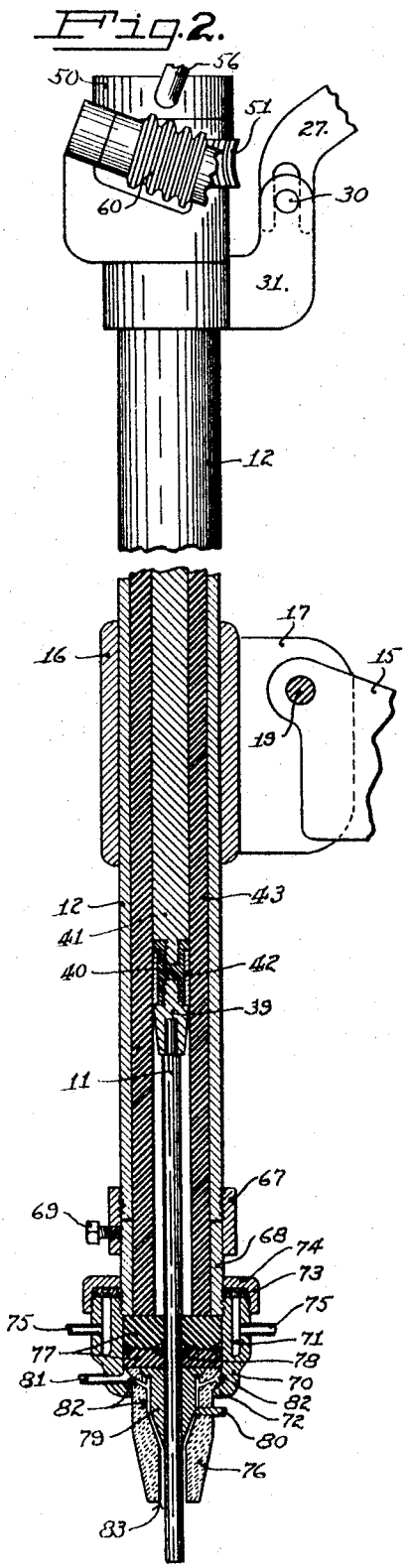
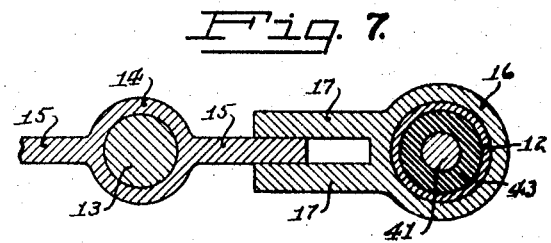
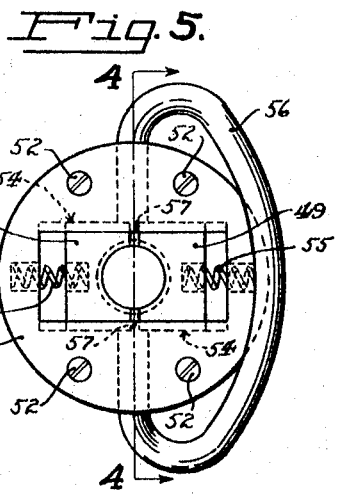
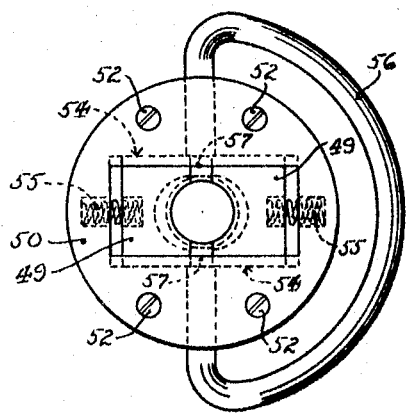
INVENTOR.
Augustin J. Hand
BY
Burth . Burth
ATTORNEYS.

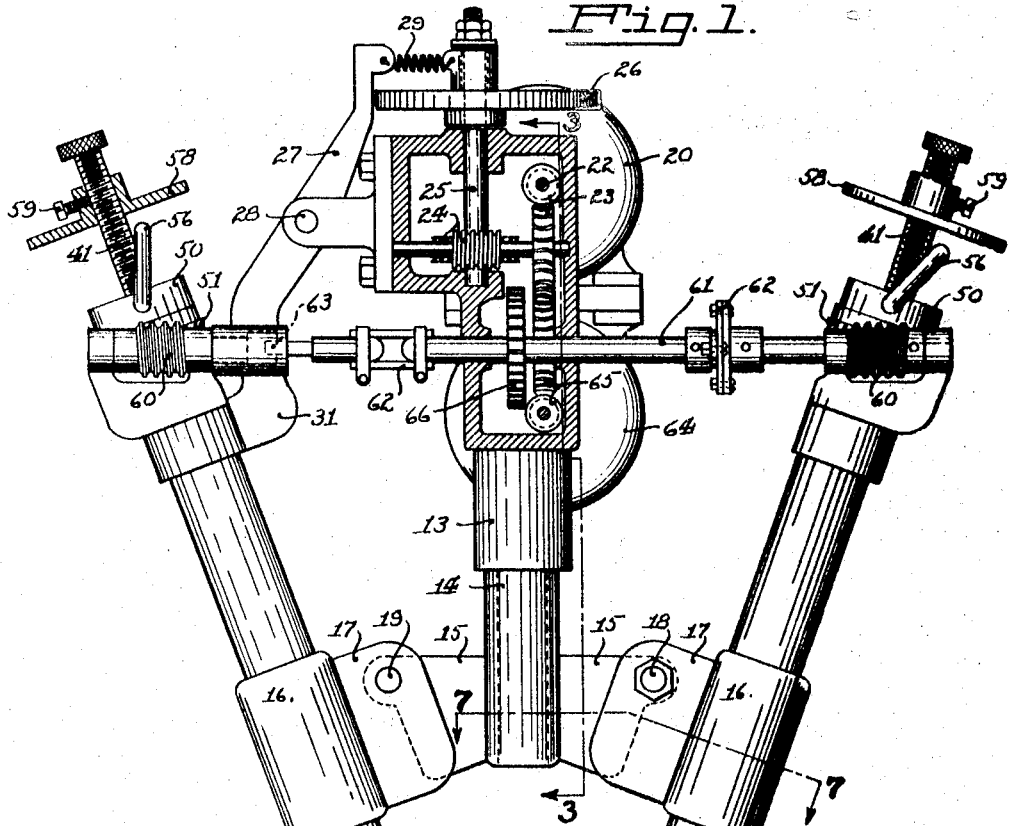
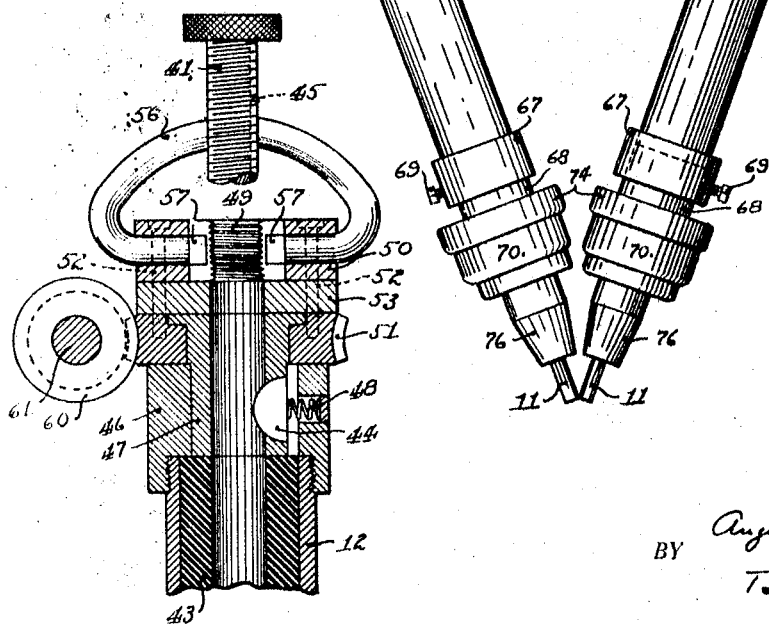

April 2, 1929. A. J. HAND 1,707,433
AUTOMATIC ELECTRIC WELDING APPARATUS
Filed Feb. 15, 1927 3 Sheets-Sheet 3
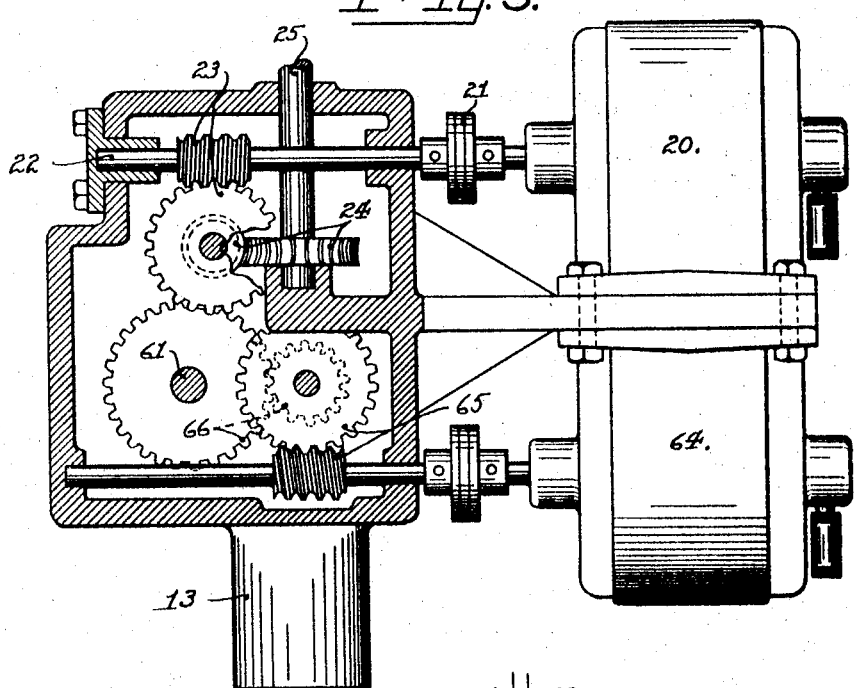
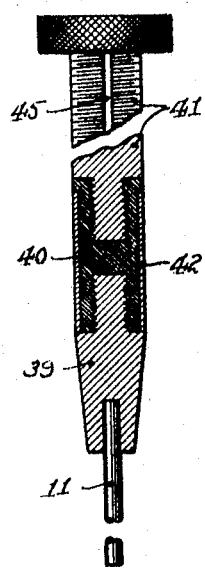
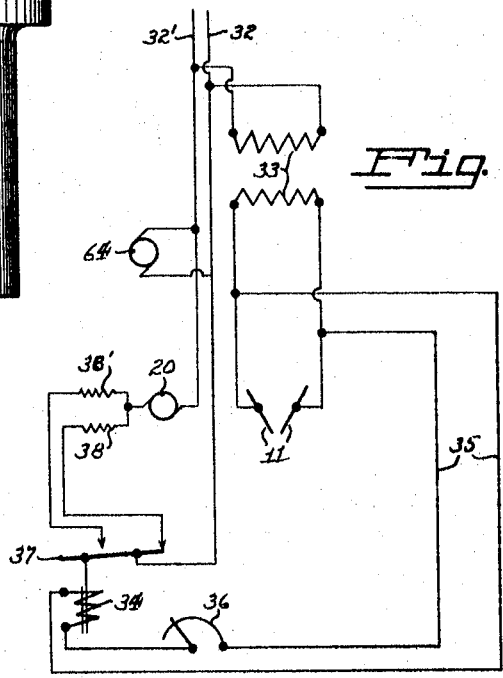
INVENTOR.
Augustin J. Hand
BY Burt & Burt
ATTORNEYS.

Patented Apr. 2, 1929.

1,707,433

UNITED STATES PATENT OFFICE.

AUGUSTIN J. HAND, OF BERKELEY, CALIFORNIA, ASSIGNOR TO CALIFORNIA CORRUGATED CULVERT COMPANY, OF BERKELEY, CALIFORNIA, A CORPORATION OF CALIFORNIA.

AUTOMATIC ELECTRIC WELDING APPARATUS.

Application filed February 15, 1927. Serial No. 168,304.

My invention relates to the electric welding art, and more particularly to that branch of the art known as atomic-welding, in which an electric arc is surrounded by a suitable gaseous envelope.

In such welding, it is essential that the width of the gap and the voltage across it be maintained within narrow limits of variation, since any change therein will considerably affect the temperature of the flame. The principal object of my invention, therefore, is to provide for the automatic regulation of the width of the gap, thereby maintaining the voltage across it practically constant. Other objects are to provide for proper cooling of the tips of the electrode holders, and for proper insulation of the electrodes themselves. These and other objects and advantages of the invention will be apparent from the following description of an apparatus embodying my invention, it being understood that the form, proportion, and arrangement of the several parts may be varied, within the limits of the claims hereto appended, without departing from the spirit of the invention as set forth in said claims.

With this in view my invention will now be described fully with reference to the accompanying drawings, which illustrate an apparatus embodying a preferred form of the invention, and in which:

Fig. 1 is a part-sectional front elevation.

Fig. 2 is a part-sectional elevation, enlarged, of one of the electrode holders.

Fig. 3 is a part sectional side elevation of the drive mechanism, taken approximately on the line 3—3 of Fig. 1 and enlarged.

Fig. 4 is a sectional detail of the feed mechanism taken on the line 4—4 of Fig. 5.

Figs. 5 and 6 are enlarged end views of the upper end of one of the electrode holders, showing the feed nut in two different positions, the holder screw being omitted.

Fig. 7 is a transverse section taken on the line 7—7 of Fig. 1 and enlarged.

Fig. 8 is a part-sectional enlarged detail of one of the holder screws and the coupling between it and the electrode.

Fig. 9 is a diagram of the electrical connections.

The apparatus uses two angularly related electrodes 11, Fig. 1, between whose ends the arc plays. Each electrode is mounted in a holder tube 12, in a manner to be described hereinafter, and both holder tubes are carried by a fixed frame 13. A bracket 14, having opposite wings 15, is secured upon a downward extension of said frame, and the holder tubes 12 are provided with collars 16 having spaced ears 17 which fit over said wings 15, as shown in Figs. 1 and 7. The right hand tube 12 is fixed to the frame by a bolt 18, Fig. 1, whereas the left hand tube is free to swing about a pivot 19 for the purpose of regulating the gap between the ends of the electrodes 11.

The rocking movement of the left hand holder 12 about its pivot 19 is accomplished by an electric motor 20, Figs. 1 and 3, mounted on the frame and connected by a suitable coupling 21 with a horizontal shaft 22. Two sets of worm gearing 23 and 24 transmit the rotation of said shaft 22, at greatly reduced speed, to a vertical shaft 25, which carries a cam 26, Fig. 1. A lever 27, pivoted at 28, bears against the periphery of said cam, and is rocked thereby. A spring 29 holds said lever against the cam. The lower end of said lever has a sliding connection 30, Fig. 2, with a bracket 31 secured to the left hand holder 12. Thus when the cam 26 is turned, the left hand holder 12 is rocked about its pivot 19, to vary the gap between its electrode and that of the right hand, or fixed holder 12. The motor 20 is reversible, so that the cam 26 may be turned in either direction as conditions may demand.

The motor 20 is controlled by the voltage across the gap between the two electrodes 11. Turning now to Fig. 9, the wires 32 and 32' indicate the electric supply line, and 33 is a transformer for supplying current to the electrodes 11 to produce the arc. A solenoid 34 of a reversing relay is shunted across the arc by wires 35. A regulating rheostat 36 is included in the relay circuit. The armature 37 of the relay is adapted to connect the line wire 32 with either one of two field coils 38 or 38' of the motor 20, both said field coils having a common connection through the armature of the motor with the other line wire 32'. Thus when the voltage across the arc rises above the desired maximum, the relay armature 37 is caused to move in one direction, energizing one of the field coils 38 or 38', as the case may be, and causing the motor 20 to rotate in the proper direction to reduce the gap between the electrodes. This decreases the voltage between said electrodes, and causes the relay to energize the other field coil, thereby reversing the motor 20 and increasing the gap. Thus the arc is kept constant within narrow limits, its voltage being automatically maintained at the desired point, which may be regulated by the rheostat 36. It is obvious, of course, that the above described relay is merely an example of a suitable means for reversing the motor 20 according to the increase or decrease of the voltage across the arc.

The electrodes 11 are also fed forwardly through their holders 12 at a constant predetermined rate to compensate for the burning away of their ends. The construction of the two holders is identical. The electrode 11 is provided with a head 39, Figs. 2 and 8, which is connected by an insulating coupling or spacer 40 with the lower end of an exteriorly threaded screw 41. A reinforcing sleeve 42 surrounds the insulating coupling 40 for the greater part of its length, as shown in Fig. 8, but a sufficient gap is left between the end of said sleeve and the screw 41 to insure the complete electrical insulation of the latter.

The screw 41 slides longitudinally in an insulating bushing 43, Fig. 2, within the holder tube 12, and extending the entire length thereof. A key 44, Fig. 4, engages a groove or key way 45 extending the entire length of the screw 41, thereby preventing it from turning in the holder. The key 44 is preferably semi-circular, and is mounted in a collar 46 and a bushing 47, both of which are secured to the upper end of the holder 12. The key is yieldable, radially of the holder, to facilitate insertion of the screw from the upper end, and is pressed by a spring 48 into engagement with said screw.

The screw 41 is fed downwardly by a rotatable split nut 49, Figs. 4, 5 and 6, carried in a head 50 which is rigidly connected with a worm gear 51, Fig. 4, said gear being rotatable about the bushing 47. Screws 52 hold the head 50, a spacer 53, and the gear 51 together. The two halves of the split nut 49 slide in guide ways 54 in the head 50, Figs. 5 and 6, and are pressed by springs 55 into engagement with the threads of the screw 41. For separating said nut halves, to cause them to release the screw, there is provided a bale 56 which has flattened ends 57 lying between the adjacent ends of the nut halves, and which may be rocked in the head 50 to cause its flattened ends to separate said halves after the manner of cams. Thus when the bale 56 is in position shown in Figs. 1, 4, and 5, the nut halves 49 are in engagement with the screw 41, and rotation of the gear 51 and the head 50, in the proper direction, will cause the screw and its electrode to feed downwardly; but when said bale is swung downwardly, to the position shown in Fig. 6, its cam-like ends 57 separate the nut halves 49 and cause them to release the screw 41, which thereupon ceases its downward feed.

The upper end of the screw 41 is provided with a flange or disk 58, Fig. 1, secured upon it by a set screw 59, and adapted to engage and move the bale 56 downwardly, so that the feed automatically ceases before the screw 41 reaches its lower limit of travel. When the bale 56 is swung downwardly, to cause the split nut 49 to release the screw 41, said screw may be withdrawn for the replacement of its electrode 11.

The gear 51 carrying the split nut 49 is rotated by a worm 60, Fig. 4. The worms of both holders are mounted upon a horizontal shaft 61, Fig. 1, provided with suitable flexible or universal joints at 62, and with a slip joint at 63 to permit movement of the left hand holder. A motor 64, Figs. 1 and 3, drives the shaft 61 through worm gearing 65 and spur gears 66, both of which reduce its speed. The motor 64 is shown in Fig. 9 as connected directly to the line 32—32', so that it runs continuously while the arc is in operation. Any suitable means, not shown, may be provided for adjusting the speed of said motor 64 so that the rate of feed of the electrodes will correspond to their rate of decomposition.

The tip portion of each holder, through which the end of the electrode protrudes, is shown in Fig. 2. A collar 67 is permanently secured to the lower end of the holder tube 12, and into said collar is slipped a removable short sleeve 68, which fits over the end portion of the insulating bushing 43 and carries the entire tip. A set screw 69 holds said tip in place. The short sleeve 68 has secured to it a cap member 70 provided with an annular cooling chamber 71 and with an inwardly turned flange 72 at its lower end. The upper end of the cooling chamber 71 is closed by a gasket 73 and a screw cap 74, and suitable connections 75 are provided through which water or other cooling fluid may be introduced and discharged.

The flange 72 of the chambered member 70 retains a tip 76, formed of suitable insulating and heat resisting material. A pair of insulating disks 77 are clamped between the upper end of the tip 76 and the lower ends of the bushing 43 and sleeve 68, and suitable packing is provided at 78 around the electrode 11 and around the inner periphery of the chambered member 70 to prevent leakage of gas upwardly into the holder. A metallic contact bushing 79 is mounted within the tip 76, and is a close sliding fit around the electrode 11. A connection 80 is provided, by which the electric current is conducted to the contact bushing 79 and from it to the electrode. The tip 76, the disks 77, the sleeve 43, and the coupling 40 insulate the electrode completely from the holder tube 12 and the frame of the apparatus.

The gas enters through a connection 81, passes through annular, radial and longitudinal channels 82, and finally issues from the annular space 83 between the tip 76 and the electrode 11, forming an enveloping cloud about the ends of the electrodes and the arc playing between them. The gas chambers and passages are in fairly close proximity to the cooling chamber 71, so that the temperature of the incoming gas is kept within safe limits.

I claim:—

1. An automatic welding apparatus comprising a pair of angularly related electrodes adapted to maintain an electric arc between their adjacent ends; and means controlled by the difference in electrical potential between said electrodes for varying the angular relation between them to maintain a constant distance between their adjacent ends.

2. An automatic welding apparatus comprising a pair of angularly related electrodes adapted to maintain an electric arc between their adjacent ends; and means controlled by the difference in electrical potential between said electrodes for regulating the distance between their adjacent ends by varying their angular relation.

3. An automatic welding apparatus comprising a pair of angularly related electrodes adapted to maintain an electric arc between their adjacent ends; means for continuously feeding said electrodes longitudinally; and means controlled by the difference in electrical potential between said electrodes for varying the angular relation between them to regulate the distance between their adjacent ends.

4. An automatic welding apparatus comprising a pair of electrodes adapted to maintain an electric arc between their adjacent ends; means for continuously feeding said electrodes toward each other; and means for automatically maintaining a constant distance between the adjacent ends of said electrodes by a movement distinct from the said continuous feeding movement.

5. An automatic welding apparatus comprising a pair of electrodes adapted to maintain an electric arc between their adjacent ends; means for continuously feeding said electrodes toward each other; and means controlled by the difference in electrical potential between said electrodes for regulating the distance between their adjacent ends by a movement distinct from the said continuous feeding movement.

6. An automatic welding apparatus comprising a pair of relatively movable electrodes adapted to maintain an electric arc between their adjacent ends; means for continuously feeding said electrodes toward each other; a reversible motor for increasing and decreasing the distance between said adjacent ends; and means actuated by the difference in electrical potential between said electrodes for controlling the operation of said motor.

7. An automatic welding apparatus comprising a pair of relatively movable electrodes adapted to maintain an electric arc between their adjacent ends; an electric motor for continuously feeding said electrodes toward each other; a second reversible motor for increasing and decreasing the distance between the adjacent ends of said electrodes independently of their feeding movement; and means actuated by the difference in electrical potential between said electrodes for controlling the operation of said reversible motor.

8. An automatic welding apparatus comprising a pair of electrodes adapted to maintain an electric arc between their adjacent ends; an electric motor for feeding said electrodes toward each other; and a second reversible motor for automatically regulating the distance between the adjacent ends of said electrodes.

9. An atomic welding apparatus comprising a pair of angularly related tubular electrode holders; a pair of electrodes mounted in said holders and adapted to maintain an electric arc between their adjacent ends; means for advancing said electrodes through said holders; means associated with said holders for directing a stream of gas into the region of the arc; and means controlled by the difference in electrical potential between said electrodes for regulating the distance between their adjacent ends by varying their angular relation.

10. In a welding apparatus, an electrode holder; a threaded rod mounted therein; an electrode carried by said rod; a nut rotatably mounted in said holder and adapted for engagement with the threads of said rod; means for rotating said nut to advance said rod and the electrode carried thereby; and means for automatically disengaging said nut from said rod.

11. In a welding apparatus, an electrode holder; a threaded rod mounted therein; an electrode carried by said rod; a split nut rotatably mounted in said holder and normally adapted for engagement with the threads of said rod; means for rotating said nut to advance said rod and the electrode carried thereby; and means for automatically separating the two portions of said split nut to disengage them from said rod.

12. An automatic welding apparatus comprising a pair of electrode holders; a pair of electrodes carried by said holders and adapted to maintain an electric arc between their adjacent ends; means for continuously feeding said electrodes longitudinally in their respective holders; a fixed frame between said holders, one holder being rigidly connected with said frame and the other pivotally mounted thereupon; and means carried by said frame and adapted to automatically oscillate the movable holder about its pivot to vary the distance between the adjacent ends of said electrodes.

13. An automatic welding apparatus comprising a pair of electrode holders; a pair of electrodes carried by said holders and adapted to maintain an electric arc between their adjacent ends; a fixed frame between said holders, one holder being rigidly connected with said frame and the other pivotally mounted thereupon; means carried by said frame and adapted to automatically oscillate the movable holder about its pivot to vary the distance between the adjacent ends of said electrodes; and means carried by said frame for feeding said electrodes forwardly in their separate holders.

In testimony whereof I have signed my name to this specification.

AUGUSTIN J. HAND.